US010605300B2

(12) United States Patent
Yasuo et al.

(10) Patent No.: US 10,605,300 B2
(45) Date of Patent: Mar. 31, 2020

(54) POWDER FOR THERMAL SPRAY, THERMAL SPRAY COATING FILM, COATING FILM AND ROLL IN MOLTEN METAL BATH

(71) Applicants: FUJIMI INCORPORATED, Kiyosu-shi, Aichi (JP); TOCALO CO., Ltd., Kobe-shi, Hyogo (JP)

(72) Inventors: Noriyuki Yasuo, Kobe (JP); Takeshi Takabatake, Kobe (JP); Tatsuo Suidzu, Kobe (JP); Hiroaki Mizuno, Kiyosu (JP); Takaya Masuda, Kiyosu (JP); Tatsuya Kuno, Kiyosu (JP)

(73) Assignees: TOCALO CO., LTD., Kobe-Shi (JP); FUJIMI INCORPORATED, Kiyosu-Shi (JP)

( * ) Notice: Subject to any disclaimer, the term of this patent is extended or adjusted under 35 U.S.C. 154(b) by 173 days.

(21) Appl. No.: 15/522,743

(22) PCT Filed: Oct. 28, 2015

(86) PCT No.: PCT/JP2015/080424
§ 371 (c)(1),
(2) Date: Apr. 27, 2017

(87) PCT Pub. No.: WO2016/068202
PCT Pub. Date: May 6, 2016

(65) Prior Publication Data
US 2017/0314613 A1 Nov. 2, 2017

(30) Foreign Application Priority Data

Oct. 31, 2014 (JP) .................................. 2014-223107

(51) Int. Cl.
*F16C 13/00* (2006.01)
*C23C 4/10* (2016.01)
(Continued)

(52) U.S. Cl.
CPC ............ *F16C 13/00* (2013.01); *C22C 1/1084* (2013.01); *C22C 29/02* (2013.01); *C23C 2/003* (2013.01);
(Continued)

(58) Field of Classification Search
CPC ....... C22C 1/1084; C22C 29/02; C22C 29/08; B22F 2998/10; B22F 1/0096; B22F 3/10;
(Continued)

(56) References Cited

U.S. PATENT DOCUMENTS 4,089,682 A * 5/1978 Saito ..................... C22C 1/0433
420/439
5,328,763 A * 7/1994 Terry ..................... C22C 29/08
419/14
(Continued)

FOREIGN PATENT DOCUMENTS

CN 101517109 A 8/2009
JP H1180917 A 3/1999
(Continued)

OTHER PUBLICATIONS

Office Action issued in corresponding Chinese patent application No. 201580058324.0. dated Jan. 22, 2019.

*Primary Examiner* — David Sample
*Assistant Examiner* — Elizabeth Collister
(74) *Attorney, Agent, or Firm* — Foley & Lardner LLP

(57) ABSTRACT

A thermal spray powder is provided that contains, as constituent elements, a first element selected from W and Mo; a second element selected from Co, Ni, and Fe; a third element selected from C and B; and a fourth element formed of Si. The amount of the second element in the thermal spray powder is 40% by mole or less. The mole ratio of the fourth element to the second element in the thermal spray powder is 0.002 or greater and 0.03 or less. The thermal spray (Continued)

powder has a crystal phase containing Co, Ni, or Fe; W; and C or a crystal phase containing Co, Ni, or Fe; W or Mo; and B. In an X-ray diffraction spectrum of the thermal spray powder, the peak intensity attributed to Co, Ni, or Fe is at most 0.1 times the largest peak intensity in the same X-ray diffraction spectrum.

5 Claims, 1 Drawing Sheet

(51) Int. Cl.
    *C23C 2/00*         (2006.01)
    *C23C 4/129*       (2016.01)
    *C23C 4/067*       (2016.01)
    *C22C 29/02*       (2006.01)
    *C22C 1/10*        (2006.01)
    *C23C 4/06*        (2016.01)
    *C23C 4/12*        (2016.01)

(52) U.S. Cl.
    CPC ................ *C23C 4/06* (2013.01); *C23C 4/067* (2016.01); *C23C 4/10* (2013.01); *C23C 4/12* (2013.01); *C23C 4/129* (2016.01); *B22F 2998/10* (2013.01)

(58) Field of Classification Search
    CPC .. C23C 4/06; C23C 4/067; C23C 4/10; C23C 4/12; C23C 2/003; C23C 4/129; F16C 13/00
    See application file for complete search history.

(56) References Cited

U.S. PATENT DOCUMENTS

| | | | |
|---|---|---|---|
| 2004/0194662 A1* | 10/2004 | Itsukaichi | C23C 4/06 106/286.3 |
| 2007/0087205 A1* | 4/2007 | Jarosinski | B22F 3/115 428/446 |
| 2010/0047622 A1 | 2/2010 | Fischer | |
| 2010/0075133 A1 | 3/2010 | Ikeda et al. | |
| 2013/0040065 A1* | 2/2013 | Sato | B22F 3/115 427/450 |

FOREIGN PATENT DOCUMENTS

| | | |
|---|---|---|
| JP | 2000-144366 A | 5/2000 |
| JP | 2008-303459 A | 12/2008 |

* cited by examiner

POWDER FOR THERMAL SPRAY, THERMAL SPRAY COATING FILM, COATING FILM AND ROLL IN MOLTEN METAL BATH

TECHNICAL FIELD

The present invention relates to a coating such as a thermal spray coating that is suitable for being provided on the surface of a roll used in a molten metal bath. The present invention also relates to a thermal spray powder suitable for forming the coating and to a roll that is used in a molten metal bath and includes a surface on which the coating is formed.

BACKGROUND ART

A continuous molten plating process, which is a known technique for continuously plating a steel plate, uses rolls such as a sink roll and a support roll, which are located in a molten metal bath, to continuously guide a steel plate into the molten metal bath so that the steel plate passes through the molten metal bath. A thermal spray coating may be formed on the surface of a roll used in the molten metal bath for the purpose of improving the durability of the roll. For example, patent document 1 describes a thermal spray coating used for such a purpose that may be formed by thermally spraying powder obtained by calcining a mixture that contains tungsten carbide particles, tungsten boride particles, and cobalt particles.

PRIOR ART DOCUMENT

Patent Document

Patent Document 1: Japanese Laid-Open Patent Publication No. 11-80917

SUMMARY OF THE INVENTION

Problems that are to be Solved by the Invention

However, when the thermal spray powder of patent document 1 is thermally sprayed to obtain a thermal spray coating on a roll and the roll is used in a molten metal bath for a long time, metal components in the molten metal bath permeate and disperse into the thermal spray coating. As a result, the thermal spray coating gradually becomes prone to damage.

It is an object of the present invention to provide a coating such as a thermal spray coating that limits permeation and dispersion of metal components in a molten metal bath, that is, a coating that is highly resistant to molten metal. It is another object of the present invention to provide a thermal spray powder that is capable of forming such a coating and to provide a roll that is used in a molten metal bath and includes a surface on which such a coating is formed.

Means for Solving the Problems

To achieve the above objects and in accordance with a first aspect of the present invention, a thermal spray powder is provided that contains, as constituent elements, a first element, a second element, a third element, and a fourth element. The first element is selected from the group consisting of tungsten and molybdenum. The second element is selected from the group consisting of cobalt, nickel, and iron. The third element is selected from the group consisting of carbon and boron. The fourth element consists of silicon. The thermal spray powder contains the second element in an amount of 40% by mole or less. The mole ratio of the fourth element to the second element in the thermal spray powder is 0.002 or greater and 0.03 or less. The thermal spray powder has a crystal phase that contains cobalt, nickel, or iron; tungsten; and carbon or a crystal phase that contains cobalt, nickel, or iron; tungsten or molybdenum; and boron. In an X-ray diffraction spectrum of the thermal spray powder, the intensity of a peak attributed to cobalt, nickel, or iron is at most 0.1 times the intensity of a peak having the largest intensity among peaks appearing in the same X-ray diffraction spectrum.

The thermal spray powder contains the second element in an amount of preferably 20% by mole or greater.

In accordance with a second aspect of the present invention, a thermal spray coating is provided that is obtained by thermally spraying the thermal spray powder.

In accordance with a third aspect of the present invention, a roll is provided that is used in a molten metal bath and includes a surface on which the thermal spray coating is formed.

In accordance with a fourth aspect of the present invention, a coating is provided that contains, as constituent elements, a first element, a second element, a third element, and a fourth element. The first element is selected from the group consisting of tungsten and molybdenum. The second element is selected from the group consisting of cobalt, nickel, and iron. The third element is selected from the group consisting of carbon and boron. The fourth element consists of silicon. The coating contains the second element in an amount of 40% by mole or less. The mole ratio of the fourth element to the second element in the coating is 0.002 or greater and 0.03 or less. The coating has a crystal phase that contains cobalt, nickel, or iron; tungsten; and carbon or a crystal phase that contains cobalt, nickel, or iron; tungsten or molybdenum; and boron. A peak attributed to cobalt, nickel, or iron is not detected in an X-ray diffraction spectrum of the coating.

In accordance with a fifth aspect of the present invention, a roll is provided that is used in a molten metal bath and includes a surface on which the coating according to the fourth aspect is formed.

Figure 1:
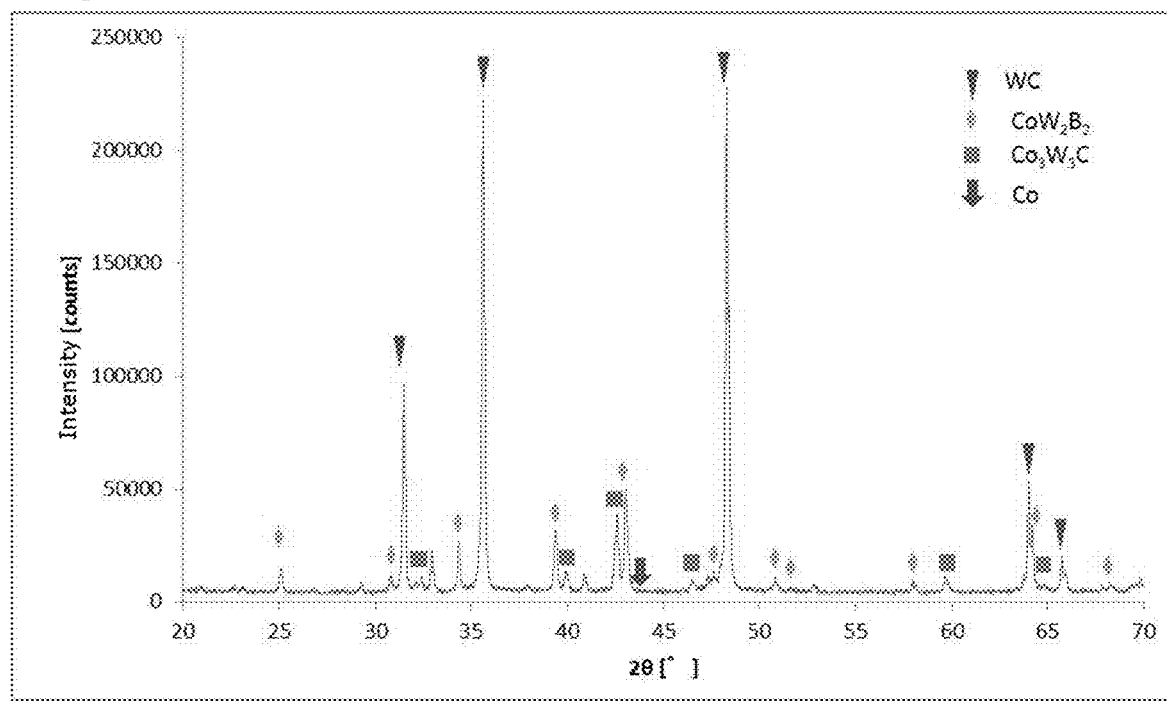
FIG. 1 shows an X-ray diffraction spectrum of a thermal spray powder of Example 2.

MODES FOR CARRYING OUT THE INVENTION (First Embodiment)

A first embodiment of the present invention will now be described. The first embodiment provides a thermal spray powder used, for example, for the purpose of forming a coating on the surface of a roll such as a sink roll or a support roll that is used in a bath of molten metal, such as zinc.

(Constituent Elements of Thermal Spray Powder)

The thermal spray powder contains, as constituent elements, a first element selected from tungsten (W) and molybdenum (Mo); a second element selected from cobalt (Co), nickel (Ni), and iron (Fe); a third element selected from carbon (C) and boron (B); and a fourth element formed of silicon (Si). The thermal spray powder may contain one or both of W and Mo as the first element. The thermal spray powder may contain one, two, or three of Co, Ni, and Fe as the second element. The thermal spray powder may contain one or both of C and B as the third element.

The amount of the first elements (W, Mo) in the thermal spray powder is preferably 50% by mole or greater, and more preferably 60% by mole or greater.

The amount of the first elements (W, Mo) in the thermal spray powder is also preferably 75% by mole or less, and more preferably 70% by mole or less.

The amount of the second elements (Co, Ni, Fe) in the thermal spray powder is preferably 20% by mole or greater, more preferably 22% by mole or greater, and further preferably 25% by mole or greater. In this case, a thermal spray coating having a superior thermal shock resistance is easily obtained.

The amount of the second elements (Co, Ni, Fe) in the thermal spray powder is also preferably 40% by mole or less, more preferably 35% by mole or less, and further preferably 30% by mole or less. In this case, a thermal spray coating having a superior molten metal resistance is easily obtained.

The amount of the third elements (C, B) in the thermal spray powder is preferably 3% by mole or greater, and more preferably 3.5% by mole or greater.

The amount of the third elements (C, B) in the thermal spray powder is also preferably 5% by mole or less, and more preferably 4.5% by mole or less.

The amount of the fourth element (Si) in the thermal spray powder is preferably 0.1% by mole or greater, and more preferably 0.2% by mole or greater. In this case, a thermal spray coating having a superior molten metal resistance is easily obtained.

The amount of the fourth element (Si) in the thermal spray powder is also preferably 1% by mole or less, and more preferably 0.8% by mole or less. Also in this case, a thermal spray coating having a superior molten metal resistance is easily obtained.

The mole ratio of the fourth element (Si) to the second elements (Co, Ni, Fe) in the thermal spray powder is preferably 0.002 or greater, more preferably 0.006 or greater, and further preferably 0.01 or greater. In this case, a thermal spray coating having a superior molten metal resistance is easily obtained.

The mole ratio of the fourth element (Si) to the second elements (Co, Ni, Fe) in the thermal spray powder is also preferably 0.03 or less, more preferably 0.02 or less, and further preferably 0.015 or less. Also in this case, a thermal spray coating having a superior molten metal resistance is easily obtained.

(Crystal Phase of Thermal Spray Powder)

The thermal spray powder has a first crystal phase that contains Co, Ni, or Fe; W; and C. Alternatively, the thermal spray powder has a second crystal phase that contains Co, Ni, or Fe; W or Mo; and B. The thermal spray powder may have both of the first crystal phase and the second crystal phase. Additionally, as the second crystal phase, the thermal spray powder may have one or both of a crystal phase that contains Co, Ni, or Fe; W; and B and a crystal phase that contains Co, Ni, or Fe; Mo; and B.

It is preferred that the thermal spray powder contain no free Co, Ni, or Fe if possible. More specifically, it is preferred that the intensity of a peak attributed to Co, Ni, or Fe in an X-ray diffraction spectrum of the thermal spray powder be at most 0.1 times the intensity of a peak having the largest intensity among peaks appearing in the same X-ray diffraction spectrum. Moreover, it is further preferred that the peak attributed to Co, Ni, or Fe be not found in the X-ray diffraction spectrum of the thermal spray powder. In this case, a thermal spray coating having a superior molten metal resistance is easily obtained.

(Manufacturing Method of Thermal Spray Powder)

The thermal spray powder is manufactured, for example, by granulating and sintering a raw material powder that is obtained by mixing carbide particles formed of tungsten carbide (WC); boride particles formed of tungsten boride (WB) or molybdenum boride (MoB); metal particles formed of Co, Ni, or Fe; and silicon-containing compound particles formed of tungsten silicide ($WSi_2$), molybdenum silicide ($MoSi_2$), silicon nitride ($Si_3N_4$), zinc silicide ($ZrSi_2$), niobium silicide ($NbSi_2$), tantalum silicide ($TaSi_2$), chromium silicide ($CrSi_2$), iron silicide ($FeSi_2$), hafnium silicide ($HfSi_2$), titanium silicide ($TiSi_2$), nickel silicide ($NiSi_2$), copper silicide ($CuSi_2$), or cobalt silicide ($CoSi_2$). The boride particles may be the combination of WB particles and MoB particles. The metal particles may be the combination of two or three of Co particles, Ni particles, and Fe particles. Alternatively, the metal particles may be particles of an alloy containing at least one selected from Co, Ni, and Fe. The silicon-containing compound particles may be the combination of two or more of $WSi_2$ particles, $MoSi_2$ particles, $Si_3N_4$ particles, $ZrSi_2$ particles, $NbSi_2$ particles, $TaSi_2$ particles, $CrSi_2$ particles, $FeSi_2$ particles, $HfSi_2$ particles, $TiSi_2$ particles, $NiSi_2$ particles, $CuSi_2$ particles, and $CoSi_2$ particles. Instead of silicon-containing compound particles, Si particles may be used.

The thermal spray powder may be manufactured by granulating and sintering a raw material powder that is obtained by mixing carbide particles formed of WC; metal particles formed of Co, Ni, or Fe; and silicon-containing compound particles formed of $WSi_2$, $MoSi_2$, $Si_3N_4$, $ZrSi_2$, $NbSi_2$, $TaSi_2$, $CrSi_2$, $FeSi_2$, $HfSi_2$, $TiSi_2$, $NiSi_2$, $CuSi_2$, or $CoSi_2$. The metal particles may be the combination of two or three of Co particles, Ni particles, and Fe particles. Alternatively, the metal particles may be particles of an alloy containing at least one selected from Co, Ni, and Fe. The silicon-containing compound particles may be the combination of two or more of $WSi_2$ particles, $MoSi_2$ particles, $Si_3N_4$ particles, $ZrSi_2$ particles, $NbSi_2$ particles, $TaSi_2$ particles, $CrSi_2$ particles, $FeSi_2$ particles, $HfSi_2$ particles, $TiSi_2$ particles, $NiSi_2$ particles, $CuSi_2$ particles, and $CoSi_2$ particles. Instead of silicon-containing compound particles, Si particles may be used.

The amount of the carbide particles contained in the raw material powder is preferably 45% by mass or greater, and more preferably 55% by mass or greater. In this case, a thermal spray coating having a superior molten metal resistance and a superior wear resistance is easily obtained.

The amount of the carbide particles contained in the raw material powder is also preferably 90% by mass or less, and more preferably 75% by mass or less. In this case, a thermal spray coating having a superior thermal shock resistance is easily obtained so that even when the thermal spray coating is repetitively used in a molten metal bath, cracks are not easily formed.

The amount of the boride particles contained in the raw material powder is preferably 10% by mass or greater, and more preferably 20% by mass or greater. In this case, a thermal spray coating having a superior molten metal resistance is easily obtained.

The amount of the boride particles contained in the raw material powder is also preferably 40% by mass or less, and more preferably 35% by mass or less. Also in this case, a thermal spray coating having a superior molten metal resistance is easily obtained.

The amount of the metal particles contained in the raw material powder is preferably 5% by mass or greater, and more preferably 8% by mass or greater.

The amount of the metal particles contained in the raw material powder is also preferably 20% by mass or less, and more preferably 15% by mass or less.

The amount of the silicon-containing compound particles or the Si particles contained in the raw material powder is preferably 0.5% by mass or greater, and more preferably 1% by mass or greater.

The amount of the silicon-containing compound particles or the Si particles contained in the raw material powder is also preferably 5% by mass or less, and more preferably 4% by mass or less.

The mole ratio of the carbide particles to the boride particles in the raw material powder is preferably 1.5 or greater, and more preferably 2 or greater.

The mole ratio of the carbide particles to the boride particles in the raw material powder is also preferably 3.5 or less, and more preferably 3 or less.

Reduction in the average particle size of the raw material powder is effective as a means for obtaining a thermal spray powder that contains as few free metals as possible. More specifically, it is preferred that the average particle size of the raw material powder be 10 μm or less. In this case, reactions between particles in the raw material powder favorably advance during sintering. Additionally, a thermal spray powder having a uniform constituent distribution is easily obtained.

To obtain a thermal spray powder that contains as few free metals as possible, it is also important that the raw material powder be sufficiently sintered. More specifically, it is preferred that after the raw material powder is granulated, sintering be performed at a temperature of 1,000° C. to 1,500° C. It is also preferred that the sintering time be thirty minutes to twenty-four hours. In this case, a thermal spray powder that contains few or no free metals can be obtained.

(Operation and Advantages of First Embodiment)

In the first embodiment, Co, Ni, or Fe, which is contained in the thermal spray powder as a constituent element, is mostly or entirely bonded to other elements instead of being free. It is assumed that this is because of the function of Si, which is also contained in the thermal spray powder as a constituent element. If free metals in thermal spray powder remain free even in a coating obtained by thermally spraying the thermal spray powder, the molten metal resistance of the coating may be lowered. It is assumed that this is due to a high affinity between the free metals in the coating and metal components in a molten metal bath. In this regard, since the thermal spray powder of the first embodiment contains few or no free metals, the thermal spray powder is suitable for forming a coating that has a superior molten metal resistance. The assumption of why the coating, which is obtained by thermally spraying the thermal spray powder of the first embodiment, has a superior molten metal resistance has been described above. However, such assumption should not restrict the present invention.

(Second and Third Embodiments)

Second and third embodiments of the present invention will now be described. The second embodiment provides a coating that is suitable for being provided on the surface of a roll such as a sink roll or a support roll used in a bath of molten metal, such as zinc. The third embodiment also provides a roll that is used in a molten metal bath and includes a surface on which the coating of the second embodiment is formed.

(Constituent Elements of Coating)

The coating contains, as constituent elements, a first element selected from W and Mo; a second element selected from Co, Ni, and Fe; a third element selected from C and B; and a fourth element formed of Si. The coating may contain one or both of W and Mo as the first element. The coating may contain one, two, or three of Co, Ni, and Fe as the second element. The coating may contain one or both of C and B as the third element.

The amount of the first elements (W, Mo) in the coating is preferably 50% by mole or greater, and more preferably 60% by mole or greater.

The amount of the first elements (W, Mo) in the coating is also preferably 75% by mole or less, and more preferably 70% by mole or less.

The amount of the second elements (Co, Ni, Fe) in the coating is preferably 20% by mole or greater, more preferably 22% by mole or greater, and further preferably 25% by mole or greater. In this case, the thermal shock resistance of the coating is improved.

The amount of the second elements (Co, Ni, Fe) in the coating is also preferably 40% by mole or less, more preferably 35% by mole or less, and further preferably 30% by mole or less. In this case, the molten metal resistance of the coating is improved.

The amount of the third elements (C, B) in the coating is preferably 3% by mole or greater, and more preferably 3.5% by mole or greater.

The amount of the third elements (C, B) in the coating is also preferably 5% by mole or less, and more preferably 4.5% by mole or less.

The amount of the fourth element (Si) in the coating is preferably 0.1% by mole or greater, and more preferably 0.2% by mole or greater. In this case, the molten metal resistance of the coating is improved.

The amount of the fourth element (Si) in the coating is also preferably 1% by mole or less, and more preferably 0.8% by mole or less. Also in this case, the molten metal resistance of the coating is improved.

The mole ratio of the fourth element (Si) to the second elements (Co, Ni, Fe) in the coating is preferably 0.002 or greater, more preferably 0.006 or greater, and further preferably 0.01 or greater. In this case, the molten metal resistance of the coating is improved.

The mole ratio of the fourth element (Si) to the second elements (Co, Ni, Fe) in the coating is also preferably 0.03 or less, more preferably 0.02 or less, and further preferably 0.015 or less. Also in this case, the molten metal resistance of the coating is improved.

(Crystal Phase of Coating)

The coating has a first crystal phase that contains Co, Ni, or Fe; W; and C. Alternatively, the coating has a second crystal phase that contains Co, Ni, or Fe; W or Mo; and B. The coating may have both of the first crystal phase and the second crystal phase. Additionally, as the second crystal phase, the coating may have one or both of a crystal phase that contains Co, Ni, or Fe; W; and B and a crystal phase that contains Co, Ni, or Fe; Mo; and B.

It is preferred that the coating contain no free Co, Ni, or Fe if possible. More specifically, it is preferred that the intensity of a peak attributed to Co, Ni, or Fe in an X-ray diffraction spectrum of the coating be at most 0.1 times the intensity of a peak having the largest intensity among peaks appearing in the same X-ray diffraction spectrum. Moreover, it is further preferred that the peak attributed to Co, Ni, or Fe be not found in the X-ray diffraction spectrum of the coating. In this case, the molten metal resistance of the coating is improved.

(Coating Forming Method)

The coating is formed, for example, by thermally spraying the thermal spray powder of the first embodiment. It is preferred that a process for thermally spraying the thermal spray powder be high velocity flame spraying, such as high velocity oxygen fuel (HVOF) spraying or high velocity air fuel (HVAF) spraying.

(Operation and Advantages of Second and Third Embodiments)

In the second embodiment, Co, Ni, or Fe, which is contained in the coating as a constituent element, is mostly or entirely bonded to other elements instead of being free. It is assumed that this is because of the function of Si, which is also contained in the coating as a constituent element. If the coating contains free metals, the molten metal resistance of the coating may be lowered. It is assumed that this is due to a high affinity between the free metals in the coating and metal components in a molten metal bath. In this regard, since the coating of the second embodiment contains few or no free metals, the coating has a superior molten metal resistance. The assumption of why the coating of the second embodiment has a superior molten metal resistance has been described above. However, such assumption should not restrict the present invention.

(Modified Embodiments)

The thermal spray powder of the first embodiment may be used for a purpose other than the purpose of forming a coating on the surface of a roll used in a molten metal bath.

The thermal spray powder of the first embodiment may contain, as a constituent element, an element other than the first to fourth elements, namely, W, Mo, Co, Ni, Fe, C, B, and Si.

The coating of the second embodiment may contain, as a constituent element, an element other than the first to fourth elements, namely, W, Mo, Co, Ni, Fe, C, B, and Si.

To further increase the non-reactivity with molten metal, for example, a coating of any ceramic having a high non-reactivity with molten metal, such as an oxide ceramic or a nitride ceramic, or of a mixture of such ceramics may be formed on the surface of the coating of the second embodiment through thermal spraying or application and calcination.

The coating of the second embodiment may be sealed with any ceramic having a high non-reactivity with molten metal, such as an oxide ceramic or a nitride ceramic, or with a mixture of such ceramics.

EXAMPLES

The present invention will now be more specifically described with examples and comparative examples.

A thermal spray powder of Comparative Example 1 was prepared by mixing WC particles, WB particles, and Co particles and then granulating and sintering the mixture. Thermal spray powders of Examples 1 to 7 and 9 to 15 and Comparative Examples 2 to 4 were prepared by mixing WC particles, WB particles or MoB particles, Co particles, Ni particles or Fe particles, WSi₂ particles, and MoSi₂ particles or Si particles and then granulating and sintering the mixture. A thermal spray powder of Example 8 was prepared by mixing WC particles, Co particles, and WSi₂ particles and then granulating and sintering the mixture. Table 1 shows the detail of each thermal spray powder.

TABLE 1

|  | Carbide Particles | Boride Particles | Metal Particles | Silicon-Containing Compound Particles or Si Particles | Si/M | Intensity Ratio of XRD Peak Attributed to Co, Ni, or Fe | Molten Metal Resistance | Thermal Shock Resistance |
|---|---|---|---|---|---|---|---|---|
| Comparative Example 1 | WC 60 mass % 49 mole % | WB 30 mass % 24 mole % | Co 10 mass % 27 mole % | — | — | 0.03 | x | ∘∘ |
| Example 1 | WC 60 mass % 49 mole % | WB 25 mass % 21 mole % | Co 10 mass % 27 mole % | WSi₂ 5 mass % 3.3 mole % | 0.029 | 0.06 | Δ | ∘∘ |
| Example 2 | WC 60 mass % 49 mole % | WB 28 mass % 23 mole % | Co 10 mass % 27 mole % | WSi₂ 2 mass % 1.3 mole % | 0.011 | 0.04 | ∘∘ | ∘∘ |
| Example 3 | WC 63 mass % 51 mole % | WB 25 mass % 20 mole % | Co 10 mass % 27 mole % | WSi₂ 2 mass % 1.3 mole % | 0.011 | 0.02 | ∘∘ | ∘∘ |
| Example 4 | WC 60 mass % 49 mole % | WB 29 mass % 24 mole % | Co 10 mass % 27 mole % | WSi₂ 1 mass % 0.7 mole % | 0.006 | 0.04 | ∘ | ∘∘ |
| Comparative Example 2 | WC 61 mass % 50 mole % | WB 22 mass % 18 mole % | Co 10 mass % 27 mole % | WSi₂ 7 mass % 4.7 mole % | 0.040 | 0.05 | x | ∘∘ |
| Example 5 | WC 60 mass % 48 mole % | WB 28 mass % 23 mole % | Co 10 mass % 27 mole % | MoSi₂ 2 mass % 2.1 mole % | 0.029 | 0.02 | Δ | ∘∘ |
| Example 6 | WC 64.5 mass % 52 mole % | WB 25 mass % 20 mole % | Co 10 mass % 27 mole % | Si 0.3 mass % 1.7 mole % | 0.023 | 0.04 | Δ | ∘∘ |
| Example 7 | WC 62 mass % 50 mole % | WB 27.5 mass % 22 mole % | Co 10 mass % 27 mole % | WSi₂ 0.5 mass % 0.3 mole % | 0.003 | 0.05 | Δ | ∘∘ |
| Example 8 | WC 86 mass % 67 mole % | — | Co 12 mass % 31 mole % | WSi₂ 2 mass % 1.3 mole % | 0.010 | 0.02 | ∘ | ∘∘ |

TABLE 1-continued

|  | Carbide Particles | Boride Particles | Metal Particles | Silicon-Containing Compound Particles or Si Particles | Si/M | Intensity Ratio of XRD Peak Attributed to Co, Ni, or Fe | Molten Metal Resistance | Thermal Shock Resistance |
|---|---|---|---|---|---|---|---|---|
| Example 9 | WC 62 mass % 51 mole % | WB 27 mass % 22 mole % | Ni 9 mass % 25 mole % | WSi$_2$ 2 mass % 1.4 mole % | 0.013 | 0.01 | ⊚ | ⊚ |
| Example 10 | WC 60 mass % 47 mole % | WB 25 mass % 20 mole % | Co 12 mass % 31 mole % | WSi$_2$ 3 mass % 1.9 mole % | 0.014 | 0.04 | ○ | ⊚ |
| Example 11 | WC 63 mass % 47 mole % | WB 30 mass % 23 mole % | Fe 11 mass % 29 mole % | WSi$_2$ 2 mass % 1.2 mole % | 0.010 | 0.05 | ⊚ | ⊚ |
| Example 12 | WC 56 mass % 36 mole % | MoB 27 mass % 22 mole % | Co 15 mass % 32 mole % | WSi$_2$ 2 mass % 1.0 mole % | 0.008 | 0.08 | ○ | ⊚ |
| Comparative Example 3 | WC 59 mass % 48 mole % | WB 25 mass % 21 mole % | Co 10 mass % 27 mole % | WSi$_2$ 6 mass % 4.0 mole % | 0.034 | 0.06 | x | ⊚ |
| Example 13 | WC 63 mass % 53 mole % | WB 30 mass % 22 mole % | Co 8 mass % 22 mole % | WSi$_2$ 3 mass % 2.1 mole % | 0.022 | 0.01 | Δ | ○ |
| Example 14 | WC 51 mass % 38 mole % | WB 30 mass % 22 mole % | Co 15 mass % 37 mole % | WSi$_2$ 4 mass % 2.4 mole % | 0.015 | 0.08 | Δ | ⊚ |
| Comparative Example 4 | WC 40 mass % 24 mole % | WB 20 mass % 12 mole % | Co 30 mass % 59 mole % | WSi$_2$ 10 mass % 4.9 mole % | 0.019 | 0.25 | x | ⊚ |
| Example 15 | WC 60 mass % 53 mole % | WB 32 mass % 28 mole % | Co 6 mass % 18 mole % | WSi$_2$ 2 mass % 1.4 mole % | 0.019 | 0.01 | ⊚ | x |

The column entitled "Carbide Particles" in Table 1 shows the kind and amount (mass percentage and mole percentage) of carbide particles used to prepare each thermal spray powder.

The column entitled "Boride Particles" in Table 1 shows the kind and amount (mass percentage and mole percentage) of boride particles used to prepare each thermal spray powder.

The column entitled "Metal Particles" in Table 1 shows the kind and amount (mass percentage and mole percentage) of metal particles used to prepare each thermal spray powder.

The column entitled "Silicon-Containing Compound Particles or Si Particles" in Table 1 shows the kind and amount (mass percentage and mole percentage) of silicon-containing compound particles or Si particles used to prepare each thermal spray powder.

The column entitled "Si/M" in Table 1 shows the mole ratio of Si to Co, Ni, or Fe in each thermal spray powder.

The column entitled "Intensity Ratio of XRD Peak Attributed to Co, Ni, or Fe" in Table 1 shows the ratio of the intensity of the peak attributed to Co (2θ=44.2°), Ni (2θ=44.5°), or Fe (2θ=44.7°) to the intensity of the peak having the largest intensity among peaks appearing in an X-ray diffraction spectrum of each thermal spray powder measured under the condition described in Table 2. FIG. 1 shows an X-ray diffraction spectrum of the thermal spray powder of Example 2. As shown in FIG. 1, the thermal spray powder of Example 2 had a crystal phase (Co$_3$W$_3$C) containing Co, W, and C and a crystal phase (CoW$_2$B$_2$) containing Co, W, and B. Although not shown in the drawings, each thermal spray powder of the other examples also had at least one of a crystal phase containing Co, Ni, or Fe; W; and C and a crystal phase containing Co, Ni, or Fe; W or Mo; and B.

Figure 2:
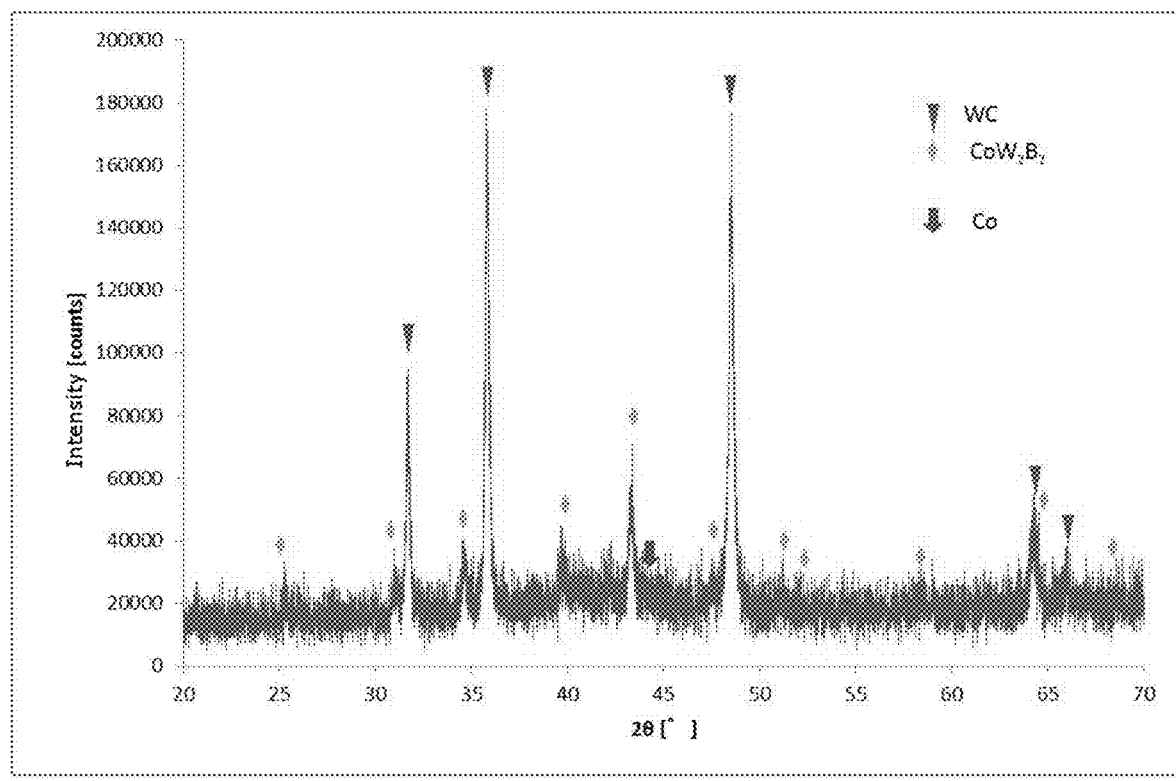
FIG. 2 shows an X-ray diffraction spectrum of a thermal spray coating formed from the thermal spray powder of Example 2.

High velocity flame spraying was performed using each thermal spray powder to form a thermal spray coating on a base material under the conditions described in Table 3. Each thermal spray coating had the same elemental composition as that of the thermal spray powder used in the thermal spraying. However, when an X-ray diffraction spectrum of each thermal spray coating was measured under the conditions described in Table 2, the peak attributed to Co, Ni, or Fe was not detected in the thermal spray coatings formed from the thermal spray powders of Examples 1 to 15. FIG. 2 shows an X-ray diffraction spectrum of the thermal spray coating formed from the thermal spray powder of Example 2. As shown in FIG. 2, while the thermal spray coating formed from the thermal spray powder of Example 2 had a crystal phase (CoW$_2$B$_2$) containing Co, W, and B, the peak attributed to Co, Ni, or Fe was not detected. Although not shown in the drawings, while the thermal spray coatings formed from the thermal spray powders of the other examples also had at least one of a crystal phase containing Co, Ni, or Fe; W; and C and a crystal phase containing Co, Ni, or Fe; W or Mo; and B, the peak attributed to Co, Ni, or Fe was not detected.

The column entitled "Molten Metal Resistance" in Table 1 shows the results of evaluating the molten metal resistance of the thermal spray coatings, each of which was formed on the base material to have a thickness of approximately 200 μm through high velocity flame spraying of each thermal spray powder under the conditions described in Table 3. The evaluation of the molten metal resistance was conducted as follows. The surface of each thermal spray coating was polished until the surface roughness Ra reached 0.3 μm. Then, a zinc pellet having a diameter of 10 mm and a thickness of 1 mm was placed on the thermal spray coating. In this state, the zinc pellet and the thermal spray coating were heated to 500° C. in an argon gas atmosphere for twenty-four hours. The thermal spray coating was cut at a portion that was in contact with the zinc pellet. The concentration of zinc in the thermal spray coating was measured at a position of the cut surface that is separated by 100 μm from the surface of the thermal spray coating using an energy dispersive X-ray (EDX) spectrometer manufactured by HORIBA, Ltd. In the column, "∘∘ (excellent)" indicates that the measured value of the concentration of zinc was less than 2%, "∘ (good)" indicates that the measured value was greater than or equal to 2% and less than 2.5%, "Δ (acceptable)" indicates that the measured value was greater than or equal to 2.5% and less than 3%, and "x (poor)" indicates that the measured value was greater than or equal to 3%.

The column entitled "Thermal Shock Resistance" in Table 1 shows the results of evaluating the thermal shock resistance of the thermal spray coatings, each of which was formed on the base material to have a thickness of approximately 200 μm through high velocity flame spraying of each thermal spray powder under the conditions described in Table 4. To evaluate the thermal shock resistance, a sequence of operations for heating each thermal spray coating and the base material together to 700° C. in the atmosphere for one hour and then quickly cooling the thermal spray coating and the base material in water was repeated. In the column, "∘∘ (excellent)" indicates that no crack was visually recognized in the surface of the thermal spray coating even after the cycle of heating and cooling was repeated twenty times, "∘ (good)" indicates that the cycle of heating and cooling needed to be repeated fifteen to nineteen times until a crack was recognized, and "x (poor)" indicates that the cycle of heating and cooling needed to be repeated fourteen times or less until a crack was recognized.

TABLE 2

Goniometer: Powder X-Ray Diffractometer Ultima IV
Manufactured by Rigaku Corporation
Scanning Mode: 2θ/θ
Scanning Type: Continuous Scan
X-Ray: Cu—Kα 20 kV/10 mA
Divergence Slit: 1°
Vertical Divergence Limit Slit: 10 mm
Scattering slit: 8 mm
Receiving slit: Open

TABLE 3

Thermal Spray Machine: High Velocity Flame Spray manufactured by Praxair/TAFA Inc.
Base Material: 20 mm Square SUS316L with thickness of 2 mm that has undergone alumina F40 blasting
Oxygen Flow Rate: 1,900 scfh (893 L/min)
Kerosene Flow Rate: 5.1 gph (0.32 L/min)
Thermal Spray Distance: 380 mm
Thermal Spray Machine Barrel Length: 203.2 mm
Thermal Spray Powder Supply Rate: 80 g/min

TABLE 4

Thermal Spray Machine: High Velocity Flame Spray manufactured by Praxair/TAFA Inc.

TABLE 4-continued

Base Material: SUS316L with diameter of 100 mm and length of 100 mm that has undergone alumina F40 blasting
Oxygen Flow Rate: 1,900 scfh (893 L/min)
Kerosene Flow Rate: 5.1 gph (0.32 L/min)
Thermal Spray Distance: 380 mm
Thermal Spray Machine Barrel Length: 203.2 mm
Thermal Spray Powder Supply Rate: 80 g/min

The invention claimed is:

1. A thermal spray powder comprising, as constituent elements:
   a first element selected from the group consisting of tungsten and molybdenum;
   a second element consisting of cobalt;
   a third element selected from the group consisting of carbon and boron; and
   a fourth element consisting of silicon, wherein
   the thermal spray powder contains the second element in an amount of 25% by mole or greater and 40% by mole or less,
   the mole ratio of the fourth element to the second element in the thermal spray powder is 0.002 or greater and 0.03 or less,
   the thermal spray powder has a crystal phase that contains cobalt; tungsten; and carbon or a crystal phase that contains cobalt; tungsten or molybdenum; and boron, and
   in an X-ray diffraction spectrum of the thermal spray powder, the intensity of a peak attributed to cobalt is at most 0.1 times the intensity of a peak having the largest intensity among peaks appearing in the same X-ray diffraction spectrum.

2. A thermal spray coating obtained by thermally spraying the thermal spray powder according to claim 1.

3. A roll used in a molten metal bath, the roll comprising a surface on which the thermal spray coating according to claim 2 is formed.

4. A coating comprising, as constituent elements:
   a first element selected from the group consisting of tungsten and molybdenum;
   a second element consisting of cobalt;
   a third element selected from the group consisting of carbon and boron; and
   a fourth element consisting of silicon, wherein
   the coating contains the second element in an amount of 25% by mole or greater and 40% by mole or less,
   the mole ratio of the fourth element to the second element in the coating is 0.002 or greater and 0.03 or less,
   the coating has a crystal phase that contains cobalt; tungsten; and carbon or a crystal phase that contains cobalt; tungsten or molybdenum; and boron, and
   a peak attributed to cobalt is not detected in an X-ray diffraction spectrum of the coating.

5. A roll used in a molten metal bath, the roll comprising a surface on which the coating according to claim 4 is formed.

* * * * *